United States Patent [19]

Calleson

[11] Patent Number: 4,744,505
[45] Date of Patent: May 17, 1988

[54] METHOD OF MAKING A HEAT EXCHANGER

[75] Inventor: Gerald C. Calleson, Madison, Conn.

[73] Assignee: The Allen Group, Inc., New Haven, Conn.

[21] Appl. No.: 867,402

[22] Filed: May 13, 1986

Related U.S. Application Data

[63] Continuation of Ser. No. 543,324, Oct. 19, 1983, abandoned.

[51] Int. Cl.$^4$ .............. B21D 39/00; B21D 53/00; B23K 31/02; B21K 29/00
[52] U.S. Cl. .................. 228/175; 228/173.2; 228/173.4; 228/183; 29/157.3 B; 29/157.3 C; 29/157.4; 165/79; 165/173
[58] Field of Search .............. 165/153, 148, 175, 173, 165/79; 29/157.3 B, 157.3 C, 157.3 R, 157.4; 228/136, 173.2, 173.3, 175, 183, 173.4

[56] References Cited

U.S. PATENT DOCUMENTS

| | | |
|---|---|---|
| 2,105,405 | 1/1938 | Chase ................................. 228/183 |
| 2,226,243 | 12/1940 | Herz ................................. 29/157.3 B |
| 2,649,127 | 8/1953 | Lake, Jr. ........................... 29/157.4 |
| 3,349,465 | 10/1967 | La Pan et al. ................. 29/157.3 R |
| 3,608,173 | 9/1971 | Watson et al. ................... 29/157.4 |
| 3,857,151 | 12/1974 | Young et al. ................... 29/157.3 B |
| 3,919,760 | 11/1975 | Roders . |
| 4,159,034 | 6/1979 | Bellovary et al. .................... 165/153 |
| 4,262,625 | 4/1981 | Carravetta . |
| 4,274,483 | 6/1981 | Cottone . |
| 4,303,823 | 12/1981 | Stine . |
| 4,311,193 | 1/1982 | Verhaeghe . |
| 4,373,369 | 2/1983 | Schey . |
| 4,377,024 | 3/1983 | Saperstein ...................... 29/157.3 C |
| 4,458,749 | 7/1984 | Melnyk .............................. 165/175 |
| 4,529,034 | 7/1985 | Saperstein .......................... 165/175 |
| 4,586,566 | 5/1986 | Kern et al. .......................... 165/173 |

FOREIGN PATENT DOCUMENTS

| | | |
|---|---|---|
| 0026434 | 4/1981 | European Pat. Off. ........ 228/173 F |
| 0435501 | 11/1926 | Fed. Rep. of Germany ... 29/157.3 B |
| 2810274 | 11/1978 | Fed. Rep. of Germany ..... 29/157.3 R |
| 1219505 | 5/1960 | France ................... 165/178 |
| 0032838 | 2/1982 | Japan .............................. 29/157.3 C |
| 198851 | 6/1923 | United Kingdom .................. 165/79 |
| 1232414 | 5/1971 | United Kingdom ................ 165/153 |
| 14454598 | 8/1976 | United Kingdom . |

OTHER PUBLICATIONS

SAE Technical Paper Series 830022, "Development of a Welded Copper-Brass Automotive Radiator-Feb. 28-Mar. 4, 1983 by Anders et al., copyright 1983.

Primary Examiner—Albert W. Davis, Jr.
Assistant Examiner—John K. Ford
Attorney, Agent, or Firm—DeLio & Associates

[57] ABSTRACT

A new and improved automotive heat exchanger and a method of assembling tubes in a header of a heat exchanger comprising, shaping the ends of non-circular cross section tubes into a substantially circular cross section, forming collared openings of substantially circular cross section in a header wall, inserting the tube ends into the openings, welding the tube ends to the collars, and bonding the tubes to the header wall.

8 Claims, 1 Drawing Sheet

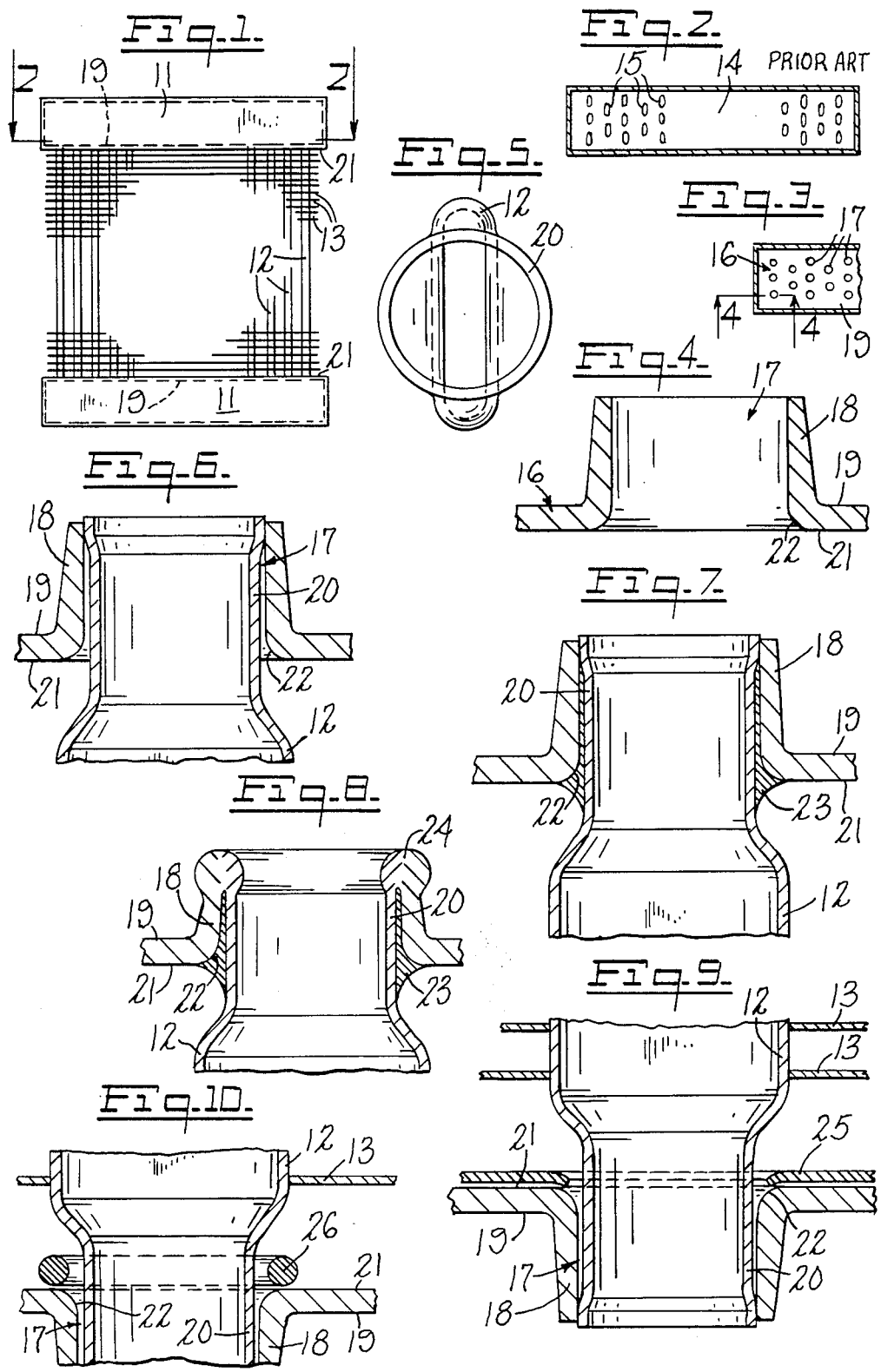

METHOD OF MAKING A HEAT EXCHANGER

This is a continuation of co-pending application Ser. No. 543,324, filed on Oct. 19, 1983, abandoned.

BACKGROUND OF THE INVENTION

This invention relates to heat exchangers and more particularly to automotive heat exchangers and radiators and to a method of making the same.

In heat exchangers such as automotive radiators, which consist of top and bottom headers with tubes attached to them and fins attached to the tubes, there is often a failure of the bond between the tubes and headers before there is a failure of the material from which the headers and tubes are made. This is usually a result of high tensile and shear stresses created from thermal expansions and contractions coupled with operational vibrations which cause the bonding material affixing the tubes to the headers to crack and fail.

A contributing factor to this failure is that most tubes in such heat exchangers are oval shaped and are joined to the headers by inserting the ends of the oval shaped tubes into oval shaped collared openings in the walls of the headers. These oval shaped tubes and the oval shaped openings do not allow for a particularly tight fit, and make it difficult to obtain a good weld. They also contribute to bonding material failure because of uneven stress distribution.

Another contributing factor to the failure of the bonding material is the corrosion of the same due to exposure to engine coolants.

In the prior art there are taught methods of forming flanged or collared openings such as in prior U.S. Pat. No. 4,373,369.

SUMMARY OF THE INVENTION

In accordance with the present invention there is taught a method of affixing tubes of non-circular cross section to a wall of a header in a heat exchanger, wherein the wall has an inner, liquid side, surface and an outer, air side, surface, comprising: forming collared openings of substantially circular cross section in the wall of the header; shaping the ends of the tubes into substantially circular cross section; inserting said tube ends into the collared openings; and bonding the tubes to the header.

The forming of the collared openings comprises punching openings into the header wall to form, from the material of the header wall, collars which project inwardly from the outer to the inner surface of the header wall. The bonding comprises welding the tube ends to the collars at the inner surface of the header wall, and/or applying a bonding material to the junction of the outer surface of the header wall and the tubes. The bonding material can be solder or brazing material or a plastic structural adhesive. The bonding material can be applied by positioning the bonding material adjacent the junctions of the outer surface of the header wall and the tubes; flowing the bonding material into said junctions, and allowing the bonding material to solidify and form a bond between the header wall and the tubes.

The invention also teaches a heat exchanger comprising at least one header defined by walls having inner, liquid-side, surfaces and outer, air-side, surfaces, at least one of said walls having therein a plurality of collared openings of substantially circular cross section; a plurality of tubes of non-circular cross section having end portions of substantially circular cross section, the end portions being received within respective collared openings to mount said tubes into communication with said header; a weld, bonding the tube ends to the collars on the inner surface of the header walls, a bonding material bonding the tubes and headers at the junctions of the outer surface of the header wall and the tube ends, and heat transfer fins attached to said tubes.

BRIEF DESCRIPTION OF THE DRAWINGS

FIG. 1 is a front elevational view of a heat exchanger;

FIG. 2 is a sectional view taken along line 2—2 of FIG. 1, showing a header wall according to the prior art;

FIG. 3 is a partial sectional view, similar to FIG. 2, showing a header wall in accordance with one embodiment of the instant invention;

FIG. 4 is a sectional view taken along line 4—4 of FIG. 3, showing the collared opening;

FIG. 5 is an end view of an oval tube with a rounded end;

FIG. 6 is a cross sectional view of an oval tube with a circular cross sectional end inserted within a collared opening in a header wall;

FIG. 7 is a cross sectional view, similar to FIG. 6 showing the bonding material in place;

FIG. 8 is a cross sectional view of an oval tube with a circular cross sectional end inserted within a collared circular opening in a header wall after welding and the placement of bonding material;

FIG. 9 is a cross sectional view of an oval tube with a circular cross sectional end within a collared circular opening in a header wall with solder foil positioned around the tube and adjacent the outer header wall, and heat transfer fins positioned on the tube; and FIG. 10 is a cross sectional view, similar to FIG. 9 showing a ring of solder in place of the solder foil.

DESCRIPTION OF THE PREFERRED EMBODIMENT

Referring to the drawings, FIG. 1 shows a heat exchanger such as an automotive radiator or the like with headers 11, tubes 12 and fins 13. In use the header contains a liquid coolant, and the header walls accordingly have an inner or liquid side and an outer or air side. The tubes are oval in cross sectional shape so as to minimize air drag and maximize heat transfer. FIG. 2 shows a view of the inner, liquid side, of a typical prior art header wall 14 with oval shaped collared openings 15. In accordance with the teachings of the prior art, the oval cross sectional shaped tubes, which are similar to tubes 12, except that they are oval along their entire length, have their oval cross sectional ends inserted into the oval shaped openings 15 and attached thereto by weld and/or solder or other bonding material. This creates a problem in that the fits formed between the oval cross section tube ends and the oval collared openings are not tight and are not amenable to a good weld or solder or other bond. A circular collared opening as is taught by the invention provides a tight fit and a surface match with the tubes which allows a more uniform and potentially hermetic weld. Also, the stress on the solder or other bonds are more evenly distributed, contributing to extended fatigue life.

Referring to FIG. 3, the header wall 16 of the invention is shown to comprise substantially circular collared openings 17, according to one embodiment of the instant invention. As is more clearly shown in FIG. 4 a collared opening 17 with collar 18 protrudes into the inner, liquid side 19, of the header according to the preferred embodiment of the invention. According to another embodiment of the invention the collared opening 17 may be formed so that the collars extend in the opposite direction to those depicted in FIG. 4. The collar may be formed in various ways known in the art, such as punching a hole in the header wall and forming the collar with an appropriate die so that the collar is made from the material of the header wall and is integrally formed therewith.

As is more clearly shown in FIG. 5, the end 20 of the oval tube 12 is shaped into a substantially circular cross section corresponding to the cross section of the collared openings 17. Referring to FIG. 6., tube end 20 is inserted within and extends through collared opening 17 so that the outermost portions of both collar 18 and the tube end 20 are substantially coplanar, said outermost tube end portion being expanded to form a tight fit with the outermost portion of collar 18 while leaving an annular open junction 22 between the remaining portions of collar 18 and tube end 20.

Thereafter as shown in FIG. 7, the tube 12 is bonded to the outer, air side, surface of the header wall 21 at the junction 22 of the tube and header wall. The bonding is performed by flowing bonding material 23 such as solder, or brazing material or a plastic structural adhesive such as epoxy, hot melt nylon or the like into the junction. The ends of the tubes 20 can also be bonded by welding the collar 18 to the tube end 20 as more clearly shown in FIG. 8 which shows the weld 24. The tubes can be bonded to the header wall by welding alone, but according to the preferred embodiment of the invention the tubes 12 are first welded to the collars 18 and then a bonding material 23 is applied to the junction 22 of the tube and header wall 21. The tubes may also be bonded by applying the bonding material alone, without welding the tube ends to the collars. If the bonding consists of both welding and applying a bonding material, the welding should be performed first because the temperatures for welding are substantially higher than those for applying the bonding materials referred to above.

Referring to FIG. 9, soldering or brazing can be performed according to one embodiment of the invention, by first shaping the tube ends into substantially circular cross sections and then positioning a foil of solder or brazing material 25 about the ends of the tubes 20. The tube ends are then inserted into the collared openings and expanded. The assembly is positioned so that the foil is above the junction of the tubes and openings and thereafter the solder or brazing material is heated to flow into junction 22. This is accomplished by applying flux to the header (spray or immersion) and placing the entire header over a heat source of open flame, infra-red gas or electric heads, or focusing individually aimed burners aimed between individual tubes. Solder or brazing material can, as an alternative to foil, be in the form of rings 26 as is shown in FIG. 10.

The transfer fins 13 can be affixed at different stages of assembly, depending on the type of fins used. For example, if sheets of fins with openings for tubes are used they should be assembled onto the tubes prior to the tube ends being shaped into their circular cross sections. In FIG. 9, fins 13 are shown assembled on the tubes along with the solder foil 25, prior to melting of the solder. Some fins are attached by sliding them between the tubes after the tube and header assembly is completed. All such fin assembly methods are contemplated within the scope of the instant invention.

While the description has focused on oval cross sectioned tubes, the tubes can be of any non-circular cross sectional shape. Thus, this method of assembling tubes and headers can be used regardless of the construction of the rest of the heat exchanger. For example, it may be desirable to construct a heat exchanger which does not utilize fins but relies on the shape of the tubes. This invention would work equally as well in any heat exchanger using headers and tubes.

The invention is not limited to the steps shown in this description of the preferred embodiment but is capable of variation and modification within the spirit of the invention and the scope of the claims.

I claim:

1. A method of affixing tubes of non-circular cross section to a wall of a header in a heat exchanger, wherein the wall has a inner, liquid facing, side and an outer air facing side, comprising:
   a. forming a plurality of collars in the header wall, each of said collars having an opening of substantially circular cross section, each of said collars projecting inwardly toward said liquid facing side;
   b. shaping the ends of each of the tubes into a substantially circular cross section corresponding to a diameter which is slightly smaller than that of said collar opening;
   c. inserting each of said tube ends into said collar openings so that the end portions of each tube extend through each collar opening;
   d. thereafter expanding the outermost portion of said tube ends to create a tight fit between the end of the collar opening and the expanded portion of the tube end while leaving an annular opening between the body of the collar and the unexpanded remainder of the circular portion of said tube within said collar;
   e. welding said expanded tube portions to the ends of said collars; and
   f. bonding the tubes to the header by flowing a bonding material into said annular openings between the tube and the collar body.

2. The method of claim 1 wherein said bonding material is selected from the group consisting of brazing rings, solder, solder rings, brazing foil, solder foil, and an adhesive.

3. The method of claim 2 wherein step (f) comprises:
   (i) positioning the bonding material on the air facing side of the header wall adjacent to the annular openings between the body of the collar and the circular portion of said tube;
   (ii) heating said bonding material so as to cause it to flow into said annular openings; and
   (iii) allowing the bonding material to solidify and form a columnar bond between the collar bodies and the tubes.

4. The method of claim 1 wherein step [f]comprises:
   (i) positioning the bonding material adjacent to the annular openings between the body of the collar and the circular portion of said tube;
   (ii) heating said bonding material so as to cause it to flow into said annular openings; and
   (iii) allowing the bonding material to solidify and form a columnar bond between the collar bodies and the tubes.

5. The method of claim 1 wherein in step (c) said tube ends are inserted into said collar openings so that the end portions of each tube and each collar are substantially coplanar.

6. A method of affixing tubes of non-circular cross section to a wall of a header in a heat exchanger, wherein the wall has an inner, liquid facing, side and an outer air, facing, side, comprising:
   a. forming a plurality of collars in the header wall, each of said collars having an opening of substantially circular cross section, each of said collars projecting inwardly toward said liquid facing side;
   b. assembling heat transfer fins to the said tubes;
   c. shaping the ends of each of the tubes into substantially circular cross section corresponding to a diameter which is slightly smaller than that of said collar opening;
   d. positioning bonding material selected from the group consisting of brazing rings, solder rings, brazing foil, and solder foil about the circular end of each tube;
   e. inserting each of said tube ends into said collar openings so that the end portions of each tube extends through each collar opening;
   f. thereafter expanding the outermost portion of said tube ends to create a tight fit between the end of a collar opening and the expanded portion of the tube end while leaving an annular opening between the body of the collar and the unexpanded remainder of the circular portion of said tube within said collar;
   g. welding said expanded tube portions to the ends of said collars; and
   h. bonding the tubes to the header by flowing a bonding material into said annular openings between the tube and the collar body.

7. The method of claim 6 wherein step [h] comprises:
   (i) positioning the bonding material adjacent to the annular openings between the body of the collar and the circular portion of said tube;
   (ii) heating said bonding material so as to cause it to flow into said annular openings; and
   (iii) allowing the bonding material to solidify and form a columnar bond between the collar bodies and the tubes.

8. The method of claim 6 wherein in step (c) said tube ends are inserted into said collar openings so that the end portions of each tube and each collar are substantially coplanar.

* * * * *